(12) United States Patent
Kahn

(10) Patent No.: US 12,132,867 B2
(45) Date of Patent: *Oct. 29, 2024

(54) UNIVERSAL RING FREE

(71) Applicant: StarLogik IP LLC, Mount Shasta, CA (US)

(72) Inventor: Ari Kahn, Mount Shasta, CA (US)

(73) Assignee: STARLOGIK IP LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/253,059

(22) Filed: Jan. 21, 2019

(65) Prior Publication Data

US 2019/0273824 A1 Sep. 5, 2019

Related U.S. Application Data

(63) Continuation of application No. 13/624,225, filed on Sep. 21, 2012, now Pat. No. 10,187,528.

(Continued)

(51) Int. Cl.
*H04M 3/54* (2006.01)
*H04L 65/1016* (2022.01)
(Continued)

(52) U.S. Cl.
CPC ........ *H04M 3/543* (2013.01); *H04L 65/1016* (2013.01); *H04L 65/1069* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 5,815,561 A | * | 9/1998 | Nguyen | H04M 15/88 379/91.01 |
| 5,825,863 A | * | 10/1998 | Walker | H04M 17/20 379/114.16 |

(Continued)

FOREIGN PATENT DOCUMENTS

| | | | | |
|---|---|---|---|---|
| EP | 2609726 B1 | 9/2014 | | |
| WO | WO-2010092439 A1 | * | 8/2010 | H04W 36/385 |

OTHER PUBLICATIONS

International Search Report corresponding to International Application No. PCT/US12/56583, Dec. 17, 2012.

(Continued)

*Primary Examiner* — Duc Nguyen
*Assistant Examiner* — Assad Mohammed
(74) *Attorney, Agent, or Firm* — Greenberg Traurig, LLP

(57) ABSTRACT

A method and system are disclosed for sending notifications asynchronously over a telephony network. The method and system include receiving a request over a first telephony connection from a first communication device associated with a first user identifying a second communication device associated with a second user, sending one or more response communications over the first telephony connection to the first communication device associated with the first user, disconnecting the first telephony connection with the first communication device of the first user, and sending a notification over a second telephony connection to the second communication device associated with the second user, the notification including information sufficient to allow the second user to identify the first user or the first communication device associated with the first user.

27 Claims, 5 Drawing Sheets

Related U.S. Application Data

(60) Provisional application No. 61/537,536, filed on Sep. 21, 2011.

(51) Int. Cl.

| | | |
|---|---|---|
| *H04L 65/1069* | (2022.01) | |
| *H04L 65/1104* | (2022.01) | |
| *H04M 15/00* | (2006.01) | |
| *H04M 15/02* | (2006.01) | |
| *H04M 17/02* | (2006.01) | |

(52) U.S. Cl.
CPC ......... *H04L 65/1104* (2022.05); *H04M 15/88* (2013.01); *H04M 15/881* (2013.01); *H04M 15/882* (2013.01); *H04M 15/888* (2013.01); *H04M 17/02* (2013.01)

(56) References Cited

U.S. PATENT DOCUMENTS

| | | | | |
|---|---|---|---|---|
| 6,212,268 B1 * | 4/2001 | Nielsen | ............ | H04M 3/42195 |
| | | | | 370/352 |
| 6,385,311 B1 * | 5/2002 | Bauer | ............... | H04M 3/42144 |
| | | | | 379/207.02 |
| 6,463,139 B1 * | 10/2002 | Davitt | ................ | H04M 15/765 |
| | | | | 455/406 |
| 6,741,687 B1 * | 5/2004 | Coppage | ............... | H04M 17/00 |
| | | | | 455/406 |
| 6,829,339 B1 * | 12/2004 | Kunugi | ................ | H04M 15/50 |
| | | | | 379/114.17 |
| 7,440,564 B2 * | 10/2008 | Hill | ...................... | H04M 3/436 |
| | | | | 379/207.02 |
| 8,576,270 B1 * | 11/2013 | Vitale | ................ | H04L 65/4007 |
| | | | | 348/14.06 |
| 8,594,637 B2 * | 11/2013 | Johnson | ................ | H04M 15/58 |
| | | | | 455/414.1 |
| 2002/0025028 A1 | 2/2002 | Manto | | |
| 2002/0193119 A1 * | 12/2002 | Goss | ..................... | H04W 76/18 |
| | | | | 455/453 |
| 2004/0192359 A1 | 9/2004 | McRaild et al. | | |
| 2005/0069104 A1 * | 3/2005 | Hanson | ................ | H04M 7/006 |
| | | | | 379/88.19 |
| 2007/0091869 A1 * | 4/2007 | Kahn | .................... | H04M 15/88 |
| | | | | 370/328 |
| 2007/0291931 A1 * | 12/2007 | DeMent | ............ | H04M 3/42017 |
| | | | | 379/418 |
| 2008/0037729 A1 * | 2/2008 | Mobin | .................... | H04L 65/40 |
| | | | | 379/88.17 |
| 2008/0139170 A1 | 6/2008 | Kahn | | |
| 2008/0198983 A1 * | 8/2008 | Citron | ............... | H04M 3/53383 |
| | | | | 379/88.22 |
| 2008/0318604 A1 * | 12/2008 | Titus | ...................... | G06Q 40/00 |
| | | | | 455/466 |
| 2009/0029673 A1 * | 1/2009 | Hamadi | ............ | H04M 15/8038 |
| | | | | 455/433 |
| 2009/0285380 A1 * | 11/2009 | Chen | .................... | H04M 3/5231 |
| | | | | 379/210.01 |
| 2010/0091971 A1 * | 4/2010 | Famous | .............. | H04M 3/5231 |
| | | | | 379/210.01 |
| 2010/0246787 A1 * | 9/2010 | Ray | ........................ | H04M 1/56 |
| | | | | 379/142.04 |
| 2011/0312305 A1 * | 12/2011 | Jajodia | ............. | H04M 3/42017 |
| | | | | 715/753 |
| 2012/0094642 A1 * | 4/2012 | Popperl | ................... | H04W 4/14 |
| | | | | 455/415 |

OTHER PUBLICATIONS

Written Opinion corresponding to International Application No. PCT/US12/56583, Dec. 17, 2012.

* cited by examiner

UNIVERSAL RING FREE

RELATED APPLICATION DATA

This application claims priority to U.S. Provisional Application Ser. No. 61/537,536 filed Sep. 21, 2011, the disclosure of which is hereby incorporated by reference in its entirety.

CROSS-REFERENCE TO RELATED APPLICATIONS

This application and the technical disclosures herein are related to the methods and systems of U.S. application Ser. No. 13/217,084, filed Aug. 24, 2011, U.S. application Ser. No. 13/095,724, filed Apr. 27, 2011, U.S. application Ser. No. 12/917,255, filed Nov. 1, 2010, U.S. application Ser. No. 12/900,367, filed Oct. 7, 2010, U.S. application Ser. No. 12/434,181, filed May 1, 2009, U.S. application Ser. No. 12/303,339, filed Feb. 10, 2009, U.S. application Ser. No. 12/176,301, filed Jul. 18, 2008, U.S. application Ser. No. 10/558,644, filed Oct. 10, 2006, U.S. application Ser. No. 10/562,343, filed Aug. 9, 2006, U.S. application Ser. No. 10/551,154, filed Sep. 28, 2005, U.S. application Ser. No. 10/556,037, filed May 7, 2004.

TECHNICAL FIELD

The subject matter described relates to telephony services on a telephony network.

BACKGROUND

A substantial number of users of modern telephone networks make use of prepayment mechanisms to pay for their calls on a network. For example, users of a conventional fixed-line telephone network who use public telephones will typically use prepayment card accounts which store a credit value which is reduced according to the cost of calls made. Users of mobile networks who make use of prepaid airtime typically purchase an airtime recharge voucher which has a unique code. The user contacts the network and enters the code, and the balance of the user's prepaid airtime is increased accordingly. As the user makes calls, the balance is reduced accordingly.

In either case, once the credit value or prepaid airtime is exhausted, the user is prevented from making further use of the network and in particular making telephone calls until a new prepayment card is obtained (or the existing card account is replenished with a further credit value) or further prepaid airtime is "loaded" on the network in some manner.

BRIEF DESCRIPTION OF THE DRAWINGS

For a better understanding of the embodiments described in this application, reference should be made to the Detailed Description below, in conjunction with the following drawings in which like reference numerals refer to corresponding parts throughout the figures.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

The disclosed embodiment provides a method and system for providing asynchronous supplementary services in a telephony network by a star "*" (also referred to as the star or asterisk key) dialing feature which permits any user to instantly and programmatically deposit a missed call to any phone in the world, without any billing exposure and without manually monitoring and disconnecting the call. Of course, in addition to the star key, any key, button, other user interface element, or combination of keys or user interface elements can be used. Additionally, rather than having to press a specific key, the star dialing services disclosed herein can be part of user or network settings for a particular type of account. Although the disclosure makes reference to "star dialing," it is understood that any of these variations can take the place of the star key.

The disclosed embodiment delivers a core managed service which disconnects the telephony up and down link in order to accelerate ring back tone (RBT) presentation and free up service.

Further, the disclosed embodiment provides a method for routing service via an intermediary switching node, triangulating service delivery by logically decoupling the telephony up and down links. Users may enter a predetermined code, symbol, or prefix on the mobile device key pad, such as the Star key before dialing a telephone number (collectively "star dial") to freely and programmatically deposit rings to any device at any location. The star dialing may also include entering a predetermined code, or symbol after dialing the telephone number (e.g., before pressing a send button).

Figure 1:
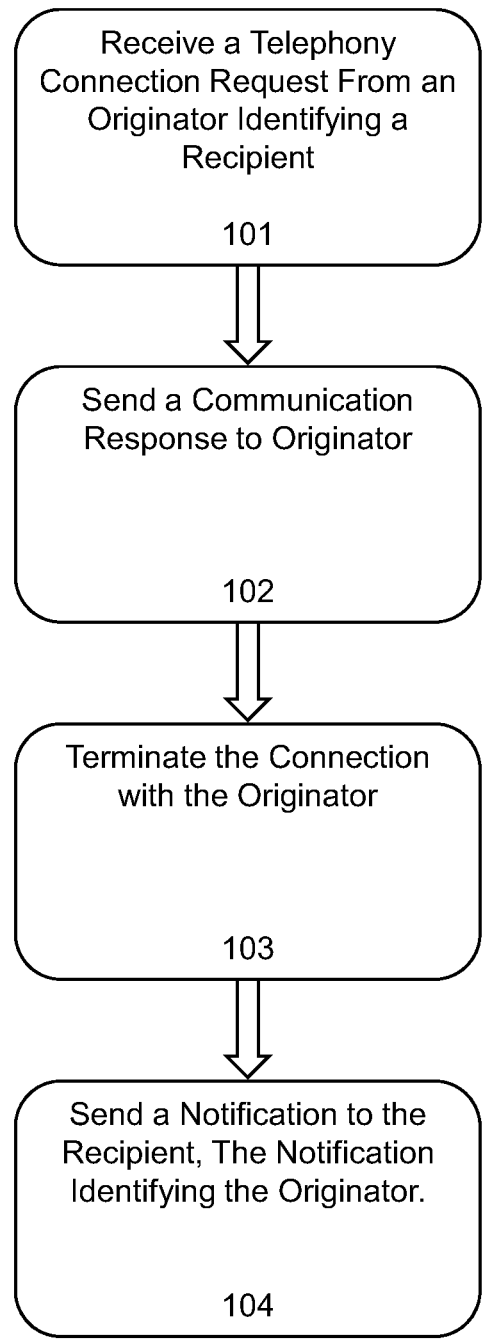
FIG. 1 is a flowchart of an exemplary method for asynchronous communication according to the disclosed embodiment.

Referring to FIG. 1, a flowchart shows an exemplary method for carrying out asynchronous notifications and communications in a decoupled telephony network according to the disclosed embodiment. In step 101, a Switching Node receives a request from a communication device associated with a first user ("originator") over a telephony connection, identifying a second user ("recipient"), or the communication device of the recipient. The telephony connection can include Voice over Internet Protocol (VoIP), a public switched telephone network (PSTN), Global System for Mobile Communications (GSM) and/or any other mobile or fixed telephony network connection, transport or bearer. Additionally, the Switching Node can be an Internet Protocol (IP) switch, an ISDN User Part (ISUP) switch, a Universal Mobile Telecommunications System (UMTS) switch, or one or more similar computing devices, such as one or more Intelligent Peripherals on the telephony network.

The request can take the form of a "star dial," as discussed above, where the first user enters an asterisk and then the number of the second user. Alternatively, the notification and communication method may be invoked by entering, without limitation, any dial prefix including * (a single leading star), ** (a double leading star), # (a single leading pound), ## (a double leading pound), *x (a single leading star followed by single or multiple decimal digits), **x (a double leading star followed by single or multiple digits), #x (a single leading pound followed by single or multiple digits), ##x (a double leading pound followed by single or multiple digits), or by other user interface element, or by any network event or condition including, without limitation, information related to the originator (the caller having insufficient credit to complete a conventional call, the subscriber network identity), the recipient (the destination network dialed, the country dialed), the network (time of day, congestion or traffic load), and the like.

Additionally, the star dial may be configured to be the default type of dial for certain types of user accounts, such that users who own those accounts can only star dial and receive incoming calls, but cannot place regular outgoing calls. The star dial feature can also be incorporated into a user device, so that the user presses a star dial button rather than a regular connect button to request a call. The star dial feature can also be automatically activated when the originator has a low account balance or when the recipient is in a certain destination network or country. For example, an originator may not have enough funds in a phone account, a credit account, or a calling card, to complete a regular long distance phone call, at which point the phone call may be converted into a star dial call. Therefore, the "star dial" feature can be activated without dialing any specific characters when one or more accounts associated with the originator are below a preset threshold. The star dial may also be activated in response to factors relating to the recipient, such as the location of the recipient, the distance between the recipient and the originator, or the mobile service provider of the recipient.

At step 102, the Switching Node sends a response communication to the originator over the telephony network. This can be a confirmation that lets the originator know that their request has gone through, and can include, for example, a ring back tone ("RBT") which sounds like the ringing of a telephone to the originator. When a RBT is the response communication, the Switching Node preemptively signals that the dialed destination (e.g. the device associated with the recipient) is ringing, when it has yet to physically connect to the recipient's device and receive network messages confirming the ring. Accordingly, a "preemptive ring" is presented to the originator. In VOIP telephony, using the SIP (Session Initiation Protocol), this early RBT presentation can be achieved by the Switching Node, on receiving a SIP INVITE from the legacy switch, an MSC (Mobile Switching Center) servicing an originator, instantly returning a "SIP Progress 180" (ringing) message, which in turn translates into an ISUP ACM (Address Complete Message) which in turn results in the MSC notifying the originator that the called recipient's phone is ringing, when in reality it is has yet to ring. Alternatively the response communication may be another type of network notification, including without limitation notifying the originator via an on-device tone, a voice announcement, an SMS message, an instant message, or an Unstructured Supplementary Service Data ("USSD") message. Additionally, the response communication can include a set of options presented to the originator, as will be discussed in greater detail below.

Optionally, the step 102 of sending a response communication to the originator can be omitted.

At step 103, the Switching Node can automatically terminate the connection with the originator. Alternatively, the originator may also terminate the connection by hanging up or disconnecting after receiving the response communication from the switch. A combination of both techniques can also be used, with the Switching Node terminating the connection after a preset period of time if the originator has not.

At step 104, the Switching Node delivers a notification to the recipient's communication device over the telephony connection, such as a missed call notification identifying the originator. The notification process is described for a missed call in greater detail below, but can also take the form of an SMS/text message, an instant message, a binary data message, a special ring tone on the recipient's device, a voice mail, or any other notification method which identifies the originator to the recipient. At this point, the recipient can call or otherwise contact the originator at their discretion and convenience. This process allows the originator to initiate, to "invite" communications with the recipient without the originator incurring any charges.

Asynchronous vs. Synchronous Connections

Figure 2A:
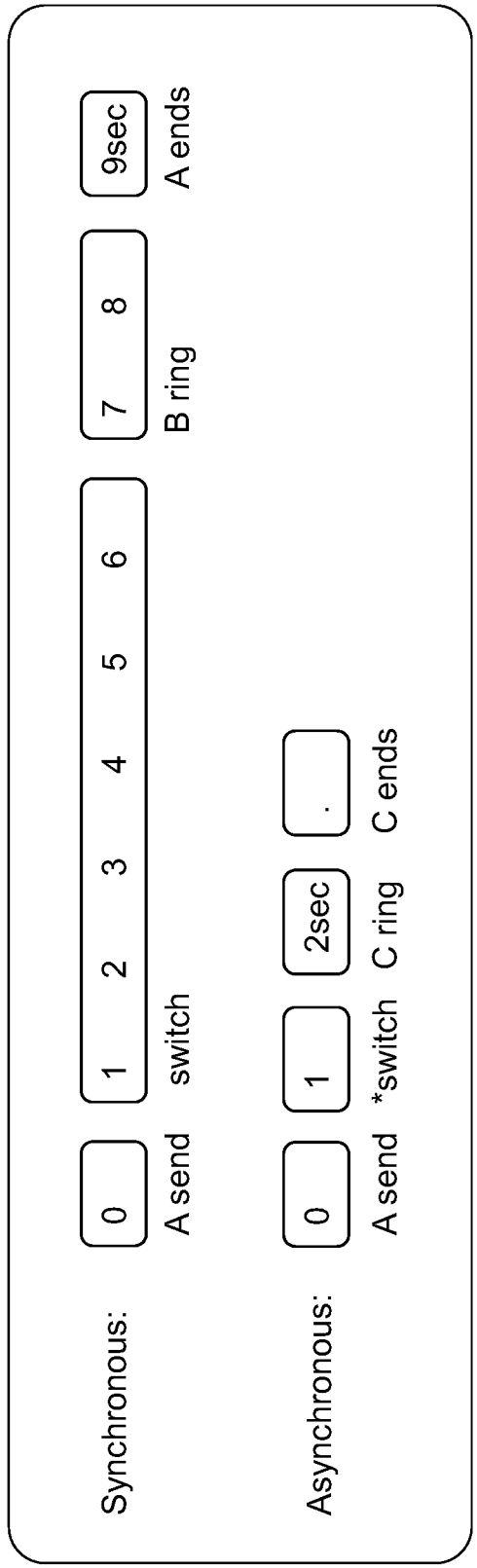
FIG. 2A is a graphical representation comparing the timing of synchronous and asynchronous notifications from the callers perspective, according to the disclosed embodiment.
Figure 2B:
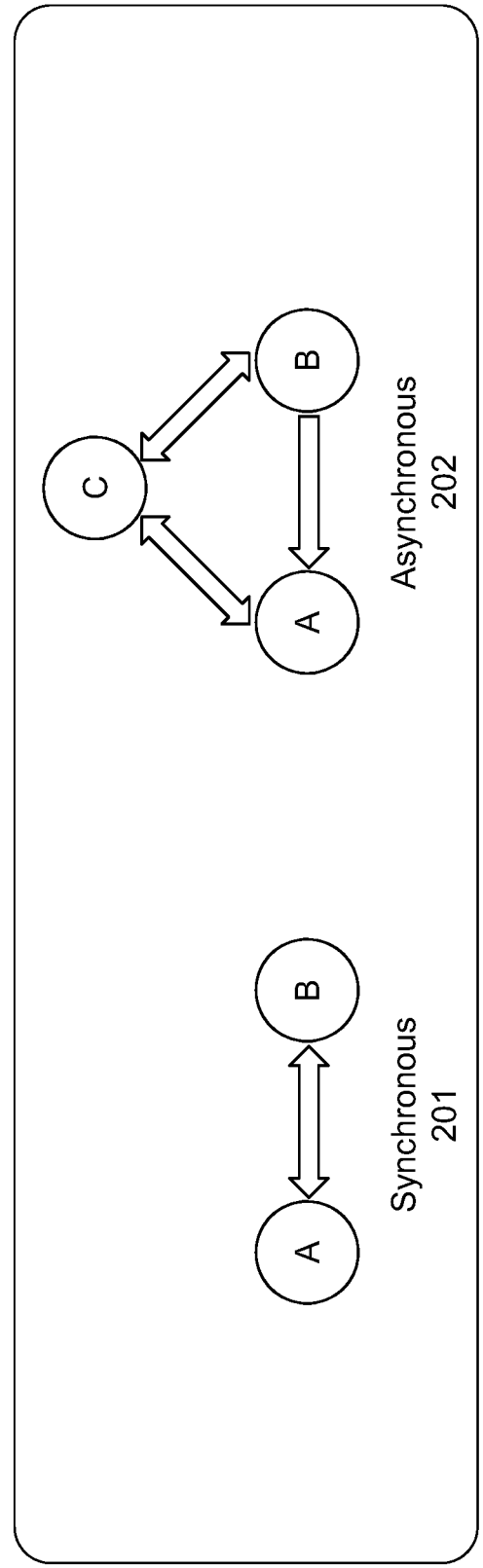
FIG. 2B is a diagram illustrating the difference between synchronous and asynchronous connection methods according to the disclosed embodiment.

FIGS. 2A-2B are graphical representations comparing synchronous and asynchronous delivery of call back messaging according to the disclosed embodiment. In the figures, the originator is labeled "A," the recipient labeled "B," and the Switching Node is labeled C. As FIG. 2B shows, in synchronous delivery 201 of a missed call, user A establishes a connection directly with user B in order to deposit a missed call or other notification. In asynchronous delivery 202, user A connects to switch C, which can connect with user B after disconnecting with user A.

Conventional synchronous missed calling is restrictive, in that it is only available to users with sufficient credit to place a call, and resource intensive in that it requires significant network resources to conduct end to end ringing. Conventional missed calling may be used when, for example, a caller A has low credit, sufficient to make a short call, but where caller A would prefer to send a notification to a call recipient B, the notification being some indication for B to call back A, thereby preserving the limited credit available. This is possible since the global billing standard is "calling party pays", and receiving is therefore free. Caller A may dial B's telephone number, wait for establishing network switching to connect to B's mobile device in B's telephony network, and disconnect after verifying a ring tone from B's mobile device.

However, as mentioned, the conventional synchronous model is limited in that it is available only to those with sufficient credit to initiate the call in the first place. Typically networks do not charge for the time it takes to initiate the call, however these networks only permit the caller to initiate the call if the caller has sufficient credit with the network or the prepaid account has sufficient credits, sufficient to cover at minimum, the first billing increment, which may be mere seconds in a per second billing protocol, or at least the first minute in a per minute billing protocol. This prepaid and "precall" credit check is to ensure that the caller has sufficient funds to cover the cost of the call if it is answered, ensuring that the network is not exposed to revenue loss. Additionally, the conventional synchronous model requires manual monitoring of the call in order to terminate before the call is answered, as well as synchronous "end to end" service delivery between users A and B.

Referring to FIG. 2A, as illustrated by the "synchronous" model (in conventional calls), the latency from the moment A sends a call request (at time 0 seconds) and when A ends a call (typically at time 9 seconds) could be significant as caller A waits for the synchronous switching to occur in order to connect to call recipient B's telephony network and device. Since the RBT can take up to 7 seconds and longer (the duration that A must wait for switching between time 1-6) this behavior is akin to "cranking the handle and waiting for the phone to ring".

In an asynchronous model, star dialing permits any user to instantly and programmatically deposit a missed call to any phone in the world, without any billing exposure to either the user, who is already disconnected prior to the destination being notified, or the network since the call is disconnected before the destination answers, and without manually monitoring and disconnecting the telephony request. By switching service via an intermediary Switching Node, node C, Star dialing "triangulates" delivery, logically decoupling the telephony up and down links. In this model, A sends a call using a star dial prefix, and is instantly connected and disconnected. Then node C, substantially simultaneously programmatically establishes the downlink portion of the call, disconnecting once B rings. That is, the intermediary Switching Node C continues with the forward switching of the call toward recipient B, without A having to be on the line and connected waiting for the switching to complete.

This "doubly disconnected protocol, which "disconnects A then rings and disconnects B," without fully connecting either party, keeps the service within the "signaling domain," permitting it to scale dramatically. Users simply star dial phone numbers to ring and disconnect in a flash. The asynchronous model thus opens the ring to any and all users with zero billing requirement and exposure. Further, as the star prefix may be set to immediately route off the MSC directly onto the disclosed node C, without conventional call authorization and billing verification, star calls may be set to bypass core network nodes critical to successfully processing and completing conventional call requests, thereby reducing network signaling and load and preserving strategic assets.

In such an immediate star call routing configuration, core network nodes including the HLR (Home Location Register), which is typically contacted for call authorization during the "Authorize_Origination_Attempt" PIC (Point In Call) in the Originating BCSM (Basic Call State Model, well known to Intelligent Network Artisans), and the Prepaid Billing SCP (Service Control Point) typically contacted during DP3 (Detection Point Three) "Analyze Information" Trigger to determine credit sufficiency, may now be bypassed, since Star calls cannot complete in the conventional sense and may thus be "unauthorized and free".

One such immediate routing configuration may be achieved by identifying all star prefixed phone numbers as "locally allowable numbers" (Locally_Allowed_Specific_Digit_String). Well known to skilled switching artisans, such Locally Allowable numbers route statically within the MSC, avoiding all triggers in the BCSM and obviating the need to conduct resource intensive MSC-HLR and MSC-SCP dialogs required for conventional call authorization verification and setup. In the Star routing case, Switching Office Data may be required to identify these additional dial patterns as "locally allowed".

This immediate call routing is well known and exemplified by "emergency calling" (112, 911 etc) services, which permits any credit-expired and any anonymous caller (a mobile without a SIM card) to make a free emergency call. Whereas Legacy "112" emergency calling service may be described as "vertical," that is between user and PSAP (Public Safety Answering Point), a "Star" call, such as a Star emergency call, is "horizontal," and permits users to directly request assistance, peer-to-peer.

In addition to bypassing core billing nodes such an asynchronous service recovers vast wireless network resources. Whereas in the synchronous ringing protocol, caller A is typically "on the airwaves" for 9 seconds and longer, in the asynchronously switched protocol disclosed, A is switched on and off the airwaves typically in just 2 seconds, and recipient B is separately notified via the legacy fixed line, the VOIP network, which only momentarily touches the wireless network infrastructure on the downlink. Star thus provides for speedy missed call notification features with automatic "2 clicks and 2 seconds" service delivery.

Asynchronous Messaging Protocol

Figure 3A:
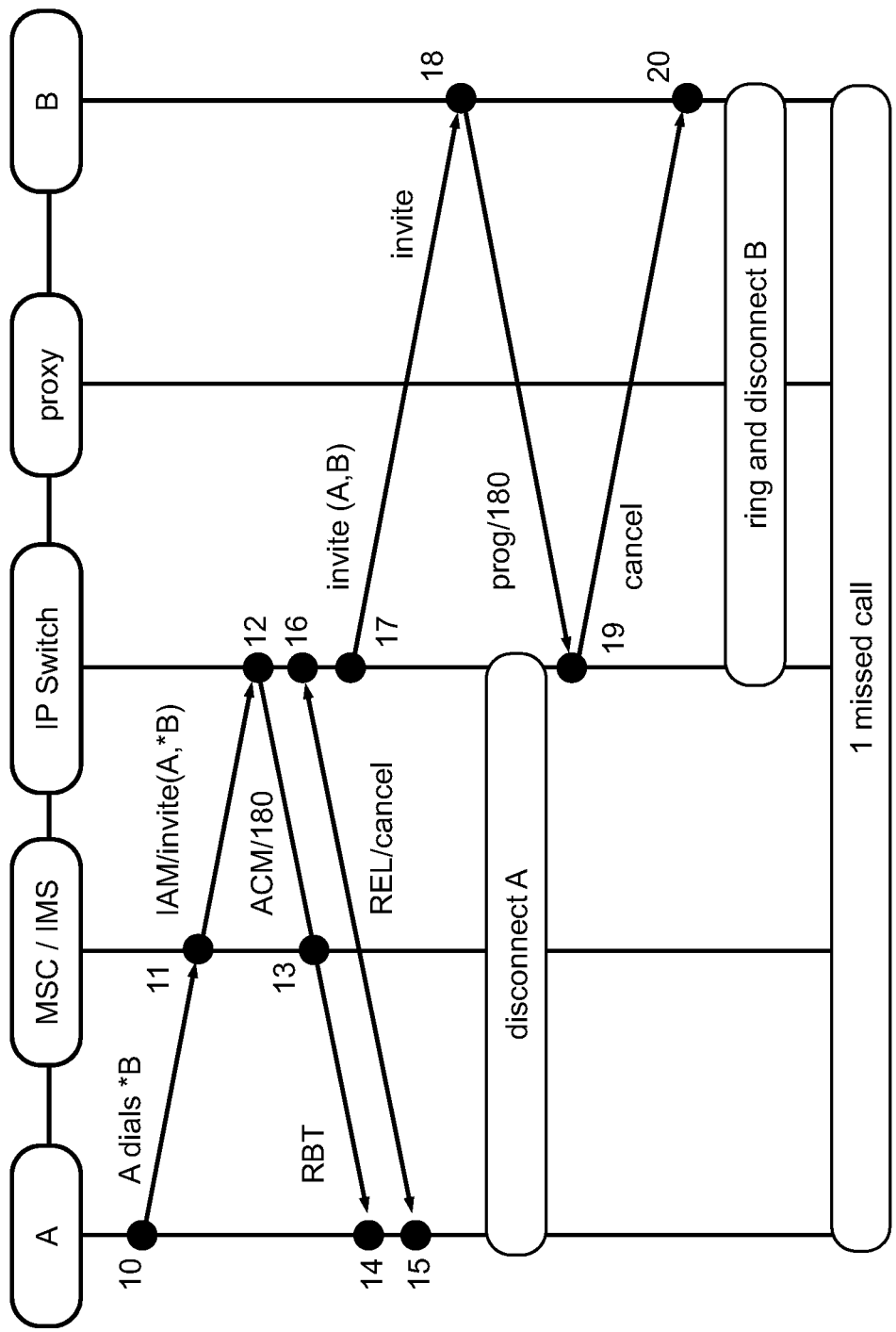
FIG. 3A is a graphical representation illustrating a dial stream step-ladder of an asynchronous messaging protocol, according to the disclosed embodiment.

FIG. 3A is a graphical representation illustrating a dial stream step-ladder of an asynchronous messaging protocol, according to the disclosed embodiment.

Step 10, shows caller A dialing and sending a call to recipient *B. While step 10 shows prefixing with * to invoke the star dial feature, as described above, any method, including without limitation to any dial prefix (*, **, #, ##, *x, **x, #x, ##x, where "x" is single or multiple digits), and any event or condition including without limitation information related to caller A (insufficient credit, subscriber network identity), called B (destination network, country), network (time of day, congestion) and the like may invoke the disclosed notification method.

Step 11 shows the call being routed via an Internet Multimedia Subsystem (IMS) to an Internet Protocol (IP) switching node which implements the disclosed notification method, however routing may be to other nodes on the telephony network, including without limitation an Intelligent Peripheral on the telephony network where the B party may be alerted using switching elements on the legacy originating network.

Steps 12, 13, 14 show the early RBT indication issued by the IP switch (12) to the originating switch (13) that results in caller A hearing the destination ringing (14), even although the destination has yet to be notified of the call request. The RBT played to caller A may be a standard network RBT or may be a custom RBT provided by the service. Alternatively the RBT may be another type of network notification, including without limitation notifying caller A via an on device tone, a voice announcement, SMS message, USSD message.

Steps 15, 16 shows that either the user disconnects manually (15) on hearing the RBT or the system (16) automatically disconnects caller A, typically if no such manual disconnection is indicated.

While steps 14, 15 show caller A disconnection after RBT presentation caller A may be automatically disconnected at step 12 without RBT presentation.

Additionally, caller A may disconnect at step 12 without RBT presentation or in response to other service announcements.

Step 17 shows the IP switch programmatically originating the downlink to the called destination B, using a SIP INVITE protocol that has the caller origination identity set to A, even although caller A is no longer connected to and participating in the call and the notification process, and that typically routes via an outbound Proxy server to the legacy network servicing the called party B.

Step 18 is where destination device is notified of the incoming call and is where ringing is emitted. While "ringing" typically emits auditory tones, it may be presented "silently", "vibrationally", "visually", or otherwise as configured by device B. Regardless of the notification, at minimum caller A identity is presented to the called party B device for display and access.

Step 19 shows the IP switch programmatically disconnecting B, issuing a SIP CANCEL command, on receiving the SIP Progress 180 ("ringing") from the Proxy, which in turn was signaled by the destination gateway connecting through to the network servicing device B, that B was alerted and is ringing.

Step 20 is where the call that was programmatically setup by the IP switch to called party B, is disconnected and where B consequently displays "a missed call from A".

While the above description refers to a ring being deposited at caller B, the asynchronous service may deposit other notification types including without limitation a text message (for example a message with caller party A information, requesting the B party to "call me"), or a specially configured data message, which similarly displays a "missed call notification" or call back request on device B.

Steps 12, 16, 17 illustrate the asynchronous processing of caller A's call request to *B. While, steps 12, 16, 17 are shown as executing sequentially they may execute substantially simultaneously or they may execute with additional intermediary logic and intentional service delivery delays toward the B party, that perform additional functions including without limitation (velocity checks on the number of such requests made by caller A, network time of day, service load conditions, availability of device B) and as such rings deposited to called B from the same caller A may be consolidated into fewer rings, where high volumes of rings may be stored for a period before forwarded to distribute and attenuate network loads, and where the unavailability of device B may trigger notification attempts later or when device B once again becomes available to the network.

Interworking of ISUP and IP Protocols

Figure 3B:
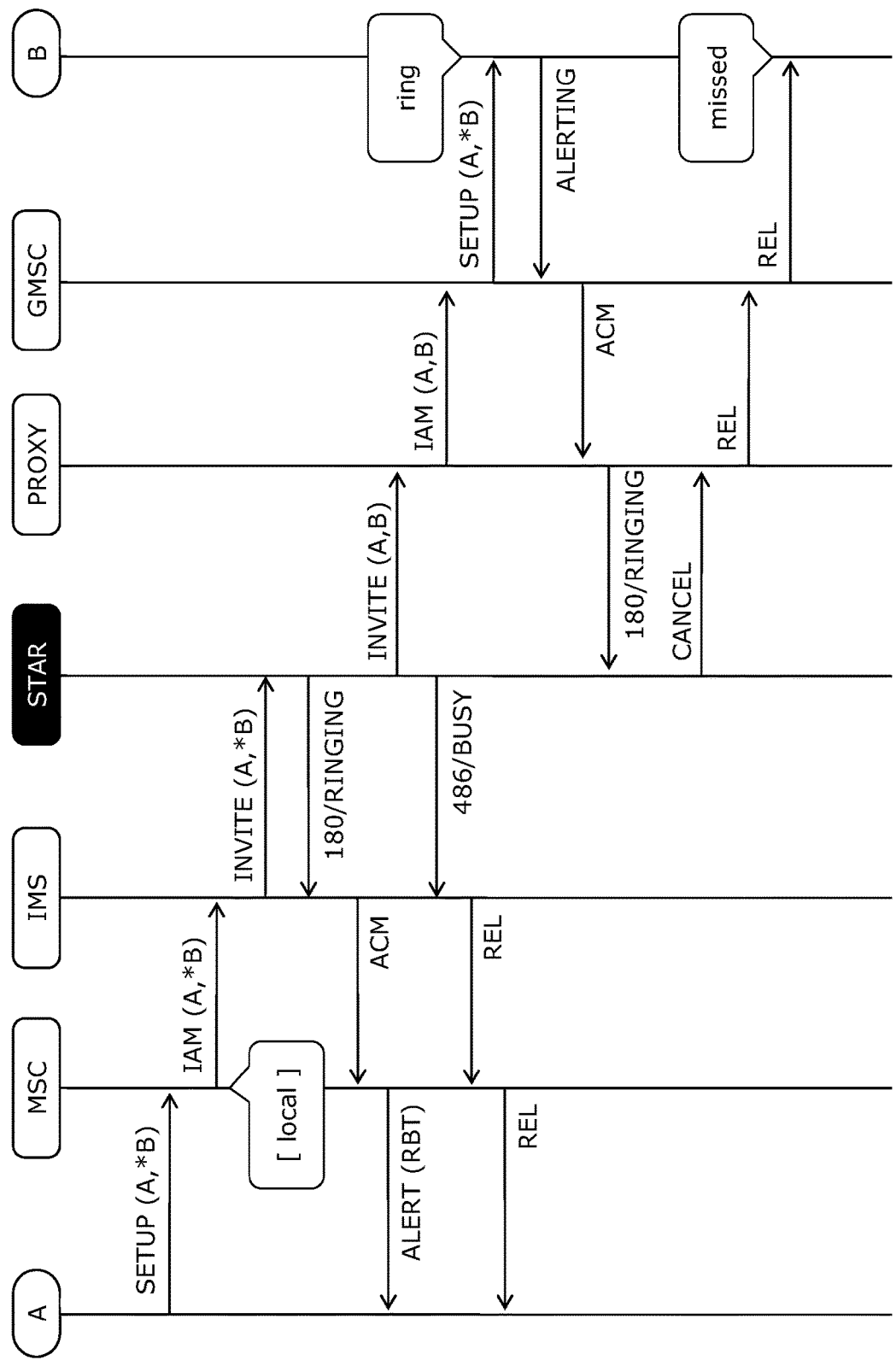
FIG. 3B is a graphical representation illustrating a dial stream step-ladder of the asynchronous messaging protocol which shows the interworking between ISUP and IP protocols, according to the disclosed embodiment.

FIG. 3B represents a dial stream step-ladder of the asynchronous messaging protocol which shows the interworking between ISUP and IP protocols. After user A star dials user B, a call setup message is sent to the MSC. As discussed earlier, star dialing can include any method of dialing, including without limitation any dial prefix (*, **, #, ##, *x, **x, #x, ##x, where "x" is single or multiple digits), and any event or condition including, without limitation, information related to caller A (insufficient credit, subscriber network identity), called B (destination network, country), network (time of day, congestion) and the like.

The star dialed number is identified as local by the MSC, which can then sends an ISUP Initial Address Message (IAM) to the IMS. The IAM typically contains the calling and called number, type of service (speech or data) and can contain many more optional parameters. After receiving the IAM, the IMS translates the call setup request into a SIP INVITE request, sent to the IP Switch (labeled "STAR" in FIG. 3B) with the called recipient set to B or *B. The IP Switch responds with a 180/RINGING message, which in turn translates into an ISUP ACM (Address Complete Message) at the IMS gateway, which in turn results in the MSC sending a RBT back to user A. After this, the IP Switch may send 486/BUSY message back to the IMS which is translated into an ISUP RELEASE message routed through the MSC and sent to user A's device which disconnects it.

Meanwhile, the IP Switch can send a SIP INVITE to an outbound Proxy Server with the caller origination identity set to user A and the recipient set to user B. This message is translated into an IAM and sent to user B's Gateway Mobile Switching Center (GMSC), which is the interworking MSC for user B's mobile phone operator. The GMSC delivers the routing required to determine the current location of device B. This results in user B's device ringing and a ring alert being routed back to the IP Switch through the GMSC and Proxy Server, where it is received as a SIP 180/RINGING message. Upon receiving this message, the IP Switch immediately sends a SIP CANCEL response toward device B, which is routed through the Proxy Server and GMSC where it translated into an ISUP RELEASE command which disconnects B. The end result is a missed call on user B's device which identifies user A.

It will be appreciated by the suitably skilled artisan, that variations in the above messaging dialog and sequence may achieve the desired result.

Presenting Options to the Originator Via a Menu

The Switching Node may be configured so that rather than, or in addition to, providing a response communication in the form of a confirmation to the originator after a star dial, the Switching Node presents a plurality of options to the originator.

Figure 4:
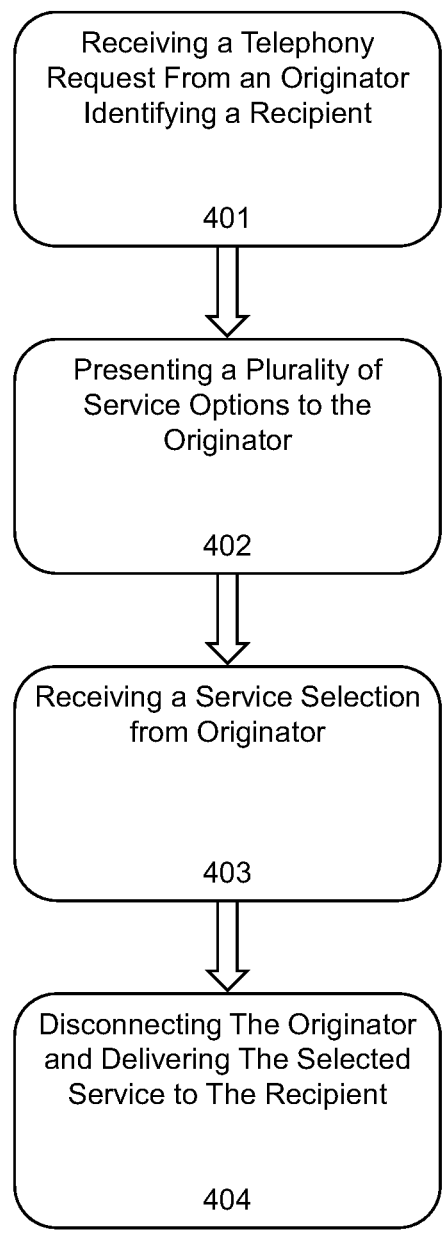
FIG. 4 is a flowchart illustrating the operating of the menu response feature according to the disclosed embodiment.

Referring to FIG. 4, the Switching Node can receive a request from the originator at step 401, the request transmitted by star dialing or other means as described above. On receiving the request, rather than, or in addition to, sending a confirmation to the originator, the switch can direct the servicing mobile network to present a plurality of service options to the originator. This may be accomplished via Interactive Voice Response (IVR), Intelligent Peripheral (IP), SMS, or USSD text menu.

The originator may at this stage choose to dismiss the menu and terminate the connection. Alternatively, the originator may provide one or more inputs to select a service option. After the originator selects a service option, the Switching Node receives the selection at step 403. The Switching Node may then terminate the connection with the originator and deliver the selected service to the recipient.

In the context of asynchronous notifications and calling, the originator may receive a menu asking them how they would like the recipient to be notified that originator would like to contact them. For example, the menu might state "Send recipient: 1) An SMS, 2) A missed call, 3) A pre-recorded voicemail," at which point originator can make a selection. The originator may navigate multiple menus and select multiple options pertaining to the notification to send to recipient, as well as preferences for being contacted. For example, the originator may select the option indicating that they would like to have an SMS sent to recipient, and select another option in a different menu indicating that the SMS should state that originator should be contacted for a specific reason or within a specific time frame. Many variations are possible and these examples are not intended to be limiting. For example, the user may select an option that permits recording a personal voice mail message for delivery to the recipient.

The Switching Node can include one or more processing units (CPU's), one or more network or other communications interfaces, memory, and one or more communication buses for interconnecting these components. The communication buses can include circuitry (sometimes called a chipset) that interconnects and controls communications between system components. The switch can optionally include a user interface, for instance a display and a keyboard. Memory may include high speed random access memory and may also include non-volatile memory, such as one or more magnetic disk storage devices. Memory can include mass storage that is remotely located from the CPU's.

The memory can store the following programs, modules and data structures, or a subset or superset thereof: an operating system that includes procedures for handling various basic system services and for performing hardware dependent tasks; a network communication module that is used for connecting the switch to other servers, network components and switches, telephony networks, or computers via one or more communication networks (wired or wireless), such as the Internet, other wide area networks, local area networks, metropolitan area networks, and so on. The memory can also store program code and data. One or more applications can be loaded into memory and can run on the operating system. Examples of application programs can include schedulers, calendars, transcoders, database programs, word processing programs, HTTP programs, customizable user interface programs, IPSec applications, encryption programs, security programs, VPN programs, SMS message servers, IM message servers, email servers, account management and so forth. A search module can also be included as an application program within applications or as a separate application. Search module can be configured to receive search terms from client devices, determine other search parameters, perform searches of data sources, provide search results, and perform other search related operations.

User communication devices can be any suitable devices. This includes, but is not limited to: mobile devices, landline phones, smart phones containing computing components, computers, tablets, PDA's, communications applications running on computing devices, and any other devices which are capable of communication over some form of telephony connection.

Communication devices can include one or more processing units (CPU's), one or more network or other communications interfaces, memory, and one or more communication buses for interconnecting these components. The communication buses can include circuitry (sometimes called a chipset) that interconnects and controls communications between system components. Communication devices can include a user input device, for instance a display and a keyboard. Memory can include high speed random access memory and can also include non-volatile memory, such as one or more magnetic disk storage devices. Memory can include mass storage that is remotely located from the CPU's. Memory can store the following programs, modules and data structures, or a subset or superset thereof: an operating system that includes procedures for handling various basic system services and for performing hardware dependent tasks; a communication module that is used for connecting the communication devices to the Switches or other computers via one or more communication networks, such as the Internet, telephony, other wide area networks, local area networks, metropolitan area networks, and so on; Memory can further includes one or more data storage, which can be utilized by communication device to store, among other things, applications and/or other data. For example, data storage can also be employed to store information that describes various capabilities of the communication device. Moreover data storage can be used to store information such as data received over a network from another computing device or communication device, data output by an application on the communication device, data input by a user of the device, or the like. For example, data storage can include data, including cookies, and/or other communication device data sent by a network device. Data storage can also include image files, social networking data, location information data, or the like, for display and/or use through various applications.

Applications may include computer executable instructions which, when executed by communications device, transmit, receive, and/or otherwise process messages (e.g., SMS, MMS, IM, email, and/or other messages), audio, video, and enable telecommunication with another user of another communication device. Other examples of application programs include calendars, search programs, email clients, IM applications, SMS applications, VOIP applications, contact managers, task managers, transcoders, database programs, word processing programs, security applications, spreadsheet programs, games, search programs, and so forth.

The foregoing description, for purpose of explanation, has been described with reference to the disclosed embodiment. However, the illustrative discussions above are not intended to be exhaustive or to limit the invention to the precise forms disclosed. Many modifications and variations are possible in view of the above teachings. In particular while A and B are sometimes referenced as mobile telephones, either or both may be fixed or VOIP telephones or any combinations thereof. The embodiment was chosen and described in order to best explain the principles of the invention and its practical applications, to thereby enable others skilled in the art to best utilize the invention with various modifications as are suited to the particular use contemplated.

What is claimed is:

1. A computer-implemented method comprising:
receiving, by at least one switching node, over a first telephony connection from a first communication device, a call request associated with a call to a phone number associated with a second communication device;
sending, by the at least one switching node, over the first telephony connection and in response to the call request, at least one first communication to the first communication device, wherein the at least one first communication comprises at least one service option;
receiving, by the at least one switching node, a selection of a service option of the at least one service option;
automatically terminating, by the switching node and in response to receiving the selection of the service option, the first telephony connection with the first communication device; and
sending, by the at least one switching node, over a second telephony connection and in response to the call request, at least one second communication to the second communication device associated with the phone number;
wherein the at least one first communication is sent to the first communication device prior to the sending the at least one second communication to the second communication device.

2. The computer-implemented method of claim 1, wherein the call request is associated with an activation of at least one character on an input interface of the first communication device.

3. The computer-implemented method of claim 2, wherein the at least one character is one of:
a "*" character, a "#" character, or a "0" character.

4. The computer-implemented method of claim 1, wherein the call request is associated with at least one financial condition related to the first communication device.

5. The computer-implemented method of claim 4, wherein the at least one financial condition related to the first communication device is one of:
a balance below a first preset threshold on an account associated with the first communication device,
an available credit amount below a second preset threshold on the account associated with the first communication device, or
an available balance below a third preset threshold on a calling card associated with the first communication device.

6. The computer-implemented method of claim 5, wherein at least one of the first preset threshold, the second preset threshold, or the third preset threshold is equal to a cost of connecting the call between the first communication device and the second communication device.

7. The computer-implemented method of claim 1, wherein the call request is a session initiation request and is associated with a type of telephone service account associated with the first communication device.

8. The computer-implemented method of claim 1, wherein the call request is associated with at least one factor relating to the second communication device.

9. The computer-implemented method of claim 8, wherein the at least one factor relating to the second communication device is one of: a location of the second communication device, a distance between the second communication device and the first communication device, and a telephone service provider of the second communication device.

10. The computer-implemented method of claim 1, wherein the call request is associated with at least one telephone network condition.

11. The computer-implemented method of claim 10, wherein the at least one telephone network condition is one of: a time of peak network traffic, a network congestion, a network load condition, a network time of day, and a network geographic coverage.

12. The computer-implemented method of claim 1, wherein the at least one first communication further comprises a signaling confirmation that comprises at least one of a ring back tone, a device tone, a voice announcement, a voice message, an SMS message, an instant message, a data message, and an unstructured supplementary service data message.

13. The computer-implemented method of claim 1, wherein the first or second telephony connections comprise at least one of a voice over Internet Protocol connection or a public switched telephone network connection.

14. The computer-implemented method of claim 1, wherein a notification to the second communication device comprises at least one of a missed call indicator, a voice message, an SMS message, an instant message, a data message, or an unstructured supplementary service data message.

15. The computer-implemented method of claim 1, wherein the at least one second communication to the second communication device comprises information sufficient to allow the second communication device to request or establish a connection with the first communication device.

16. An apparatus, the apparatus comprising:
one or more processors; and
one or more memories operatively connected to at least one of the one or more processors and having instructions stored thereon that, when executed by at least one of the one or more processors, cause at least one of the one or more processors to:
receive over a first telephony connection from a first communication device, a call request associated with a call to a phone number associated with a second communication device;
send, over the first telephony connection and in response to the call request, at least one first communication to the first communication device, wherein the at least one first communication comprises at least one service option;
receive a selection of a service option of the at least one service option;
automatically terminate, in response to receiving the selection of the service option, the first telephony connection with the first communication device; and
send, over a second telephony connection, and in response to the call request, at least one second communication to the second communication device associated with the phone number;
wherein the at least one first communication is sent to the first communication device prior to the sending the at least one second communication.

17. The apparatus of claim 16, wherein the call request is associated with an activation of at least one character on an input interface of the first communication device; and
wherein the at least one character is one of:
a "*" character, a "#" character, or a "O" character.

18. A computer-implemented method comprising:
receiving, by at least one switching node, over a first telephony connection over a telephony network, a call request from a first communication device associated with a call to a phone number associated with a second communication device;
sending, by the at least one switching node, over the first telephony connection to the first communications device and in response to the call request, at least one first communication comprising at least one service option;
receiving, by the at least one switching node, a selection of a service option of the at least one service option;
automatically terminating, by the switching node and in response to receiving the selection of the service option, the first telephony connection with the first communication device; and
sending, by the at least one switching node, over a second telephony connection and in response to the call request, at least one second communication to the second communication device associated with the phone number based on the at least one service option;
wherein the at least one service option is preemptively sent to the first communication device prior to the sending the at least one second communication.

19. The computer-implemented method of claim 18, wherein the at least one service option is from a plurality of options in an options menu sent to the first communication device over the first telephony connection.

20. The computer-implemented method of claim 19, wherein the plurality of options of the options menu are associated with a manner in which a first user of the first communication device prefers a second user of the second communication device to be notified.

21. The computer-implemented method of claim 19, wherein the plurality of options comprises an option to send:
a simple messaging service (SMS) message to the second communication device,
a missed call indication to the second communication device,
a pre-recorded voicemail to the second communication device, or
any combination thereof.

22. The computer-implemented method of claim 18, wherein the call request is associated with an activation of at least one character on an input interface of the first communication device; and
wherein the at least one character is one of:
a "*" character, a "#" character, or a "0" character.

23. An apparatus, comprising:
one or more processors; and
one or more memories operatively connected to at least one of the one or more processors and having instructions stored thereon that, when executed by at least one of the one or more processors, cause at least one of the one or more processors to:
receive, from a first communication device associated with a first user and via a first telephony connection on a telephony network, a call request to a phone number of a second communication device associated with a second user;
send, in response to the call request and over the first telephony connection on the telephony network, at least one response communication to the first communication device;
wherein the at least one response communication comprises at least one service option;
receive a selection of a service option of the at least one service option;
automatically terminate, by the switching node and in response to receiving the selection of the service option, the first telephony connection with the first communication device; and
send, over a second telephony connection and in response to the call request, at least one second communication to the second communication device associated with the phone number based on the at least one service option;
wherein the at least one service option is preemptively sent to the first communication device prior to the sending the at least one second communication.

24. The apparatus of claim 23, wherein the at least one service option is from a plurality of options in an options menu sent to the first communication device over the first telephony connection.

25. The apparatus of claim 24, wherein the plurality of options of the options menu are associated with a manner in which a first user of the first communication device prefers a second user of the second communication device to be notified.

26. The apparatus of claim 24, wherein the plurality of options comprises an option to send:
a simple messaging service (SMS) message to the second communication device,
a missed call indication to the second communication device,
a pre-recorded voicemail to the second communication device, or
any combination thereof.

27. The apparatus of claim 23, wherein the call request is associated with an activation of at least one character on an input interface of the first communication device; and
wherein the at least one character is one of:
a "*" character, a "#" character, or a "0" character.

* * * * *